United States Patent [19]
Ford

[11] 3,744,104

[45] July 10, 1973

[54] NON-RELEASABLE CLASP

[75] Inventor: David Julian Ford, Stapleford, England

[73] Assignee: TRW Incorporated, Cleveland, Ohio

[22] Filed: Jan. 31, 1972

[21] Appl. No.: 221,909

[30] Foreign Application Priority Data
Feb. 10, 1971  Great Britain..................... 4,371/71

[52] U.S. Cl............................ 24/248 SL, 40/21 C
[51] Int. Cl......................... A44b 21/00, G09f 3/14
[58] Field of Search................. 292/307 R, 320, 325; 24/16 PB, 30.5 P, 206 A, 208 A, 73 LF, 259 A, 248 SL, 255 SL, 249 SL, 90 HA, 73 HS; 40/21 C

[56] References Cited
UNITED STATES PATENTS

| 1,551,368 | 8/1925 | Cloud............................... 24/73 LF |
| 1,600,684 | 9/1926 | McGibbon...................... 24/259 A |
| 3,110,069 | 11/1963 | Jones............................. 24/73 HS |
| 3,128,114 | 4/1964 | Nierhaus............................ 292/320 |
| 3,142,088 | 7/1964 | Cravath..................... 24/90 HA UX |
| 3,323,208 | 6/1967 | Hurley....................... 24/255 SL UX |
| 3,416,200 | 12/1968 | Daddona........................... 24/208 A |
| 3,645,023 | 2/1972 | Larson................................ 40/21 C |

Primary Examiner—Donald A. Griffin
Attorney—Philip E. Parker, James R. O'Connor et al

[57] ABSTRACT

A clamp for a plastics or similar band, such as is commonly used in hospitals to secure to a person an identity tag which is intended to be resistant to removal, comprises a base and a clamping member moulded integrally with a hinging web from synthetic plastics material, the base carrying a post over which one end of the band is impaled and secured by upsetting the end of the post, and the clamping member being hingeable towards the base to clamp the free end of the band which in use is laid across the base. Co-operating lip and tongue means are provided to secure the base and clamping member together in non-releasable manner.

2 Claims, 5 Drawing Figures

PATENTED JUL 10 1973  3,744,104

NON-RELEASABLE CLASP

This invention relates to a non-releasable clasp for securing a band to a person or article.

The clasp is particularly suitable for attaching an identification band to a person, for example, a newly born baby where it is essential that the tag should be secured in such a manner that is is impossible for it to be accidentally removed.

According to the present invention there is provided a clasp for securing the ends of a band of synthetic plastics or other material comprising a one-piece moulding of synthetic plastics material including a base to which one end of the band is adapted to be non-detachably secured and a clamping member hingedly connected to one edge of the base by a flexible integral web, the clamping member and the base being hingeable together into overlapping relation to clamp the free end of the band, and being provided one with a lip and the other with a resilient tongue which in use are brought into permanent snapping engagement to maintain the clamping effect upon the free end of the band. Preferably the tongue is set in a recess in its corresponding part of the clasp by a depth such that the lip does not project beyond the surface of that part when engaged with the tongue. The base may be formed with an integral upstanding post on which one end of the band may be impaled and which may be upset to overlap the material of the band to secure it to the base in a non-releasable manner. The edge of the base opposite to the hinge may be formed with an upstanding portion shaped to provide the lip, and the clamping member is formed with a recess to accommodate the upset head of the post and a pair of upstanding lateral walls to entrap the free end of the strap against the lateral edges of the base. In one arrangement of this type the clamping member further includes an upstanding wall portion extending transversely at the end of the clamping member remote from the web, and the tongue is formed as a medial portion of the clamping member defining between its free end and the wall a slot to receive the upstanding portion of the base.

To enable the invention to be fully understood, it will now be described, by way of example, with reference to the accompanying drawings in which.

Figure 1:
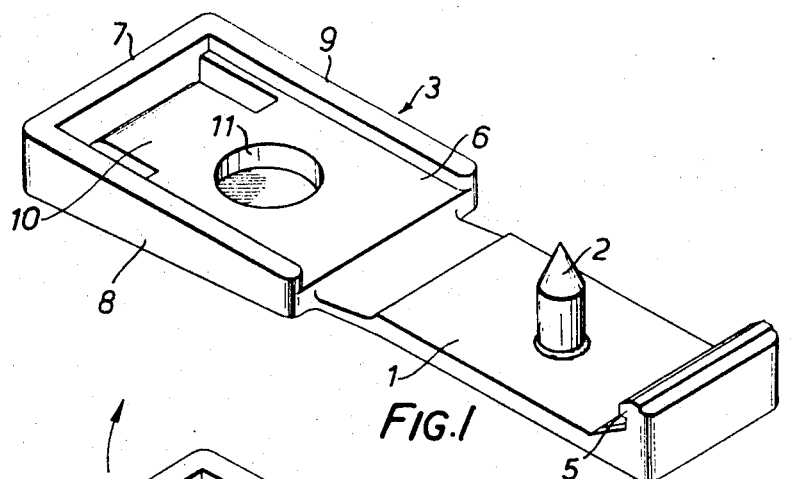
FIG. 1 is a perspective view of a clasp according to one embodiment of the invention before the end of the band is attached.
Figure 2:
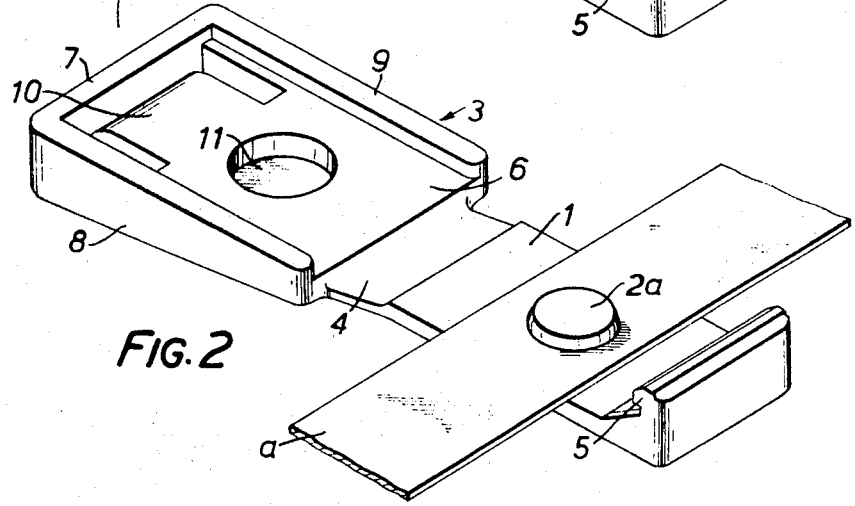
FIG. 2 is a view similar to FIG. 1 but with one end of the band attached to the base.

As shown in the drawings, the clasp is formed as a one-piece moulding of resilient or semi-resilient plastics material comprising a base 1 having an integral post 2 formed substantially centrally thereof and provided with a pointed free end. The base is integrally connected with a clamping member 3 by a flexible web 4 which permits relative hinging movement of the base and clamping member into overlapping relation.

At the edge remote from the web 4, the base is formed with a thickened edge shaped to define a lip 5 extending transversely of the base.

Figure 3:
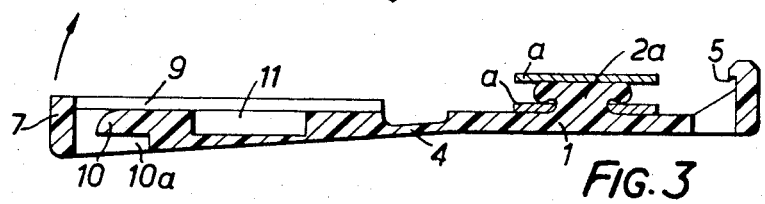
FIG. 3 is a sectional side view of FIG. 2.
Figure 4:
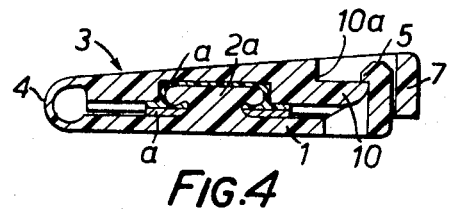
FIG. 4 is a side view of the clasp with the base and clamping member hinged into overlapping position and clamping the ends of the band.

The clamping member comprises a floor 6, an end wall 7 and opposed side walls 8 and 9. A portion of the floor adjacent the end wall 7 is moulded to form a resilient tongue 10 having a free edge extending transversely of the base. More particularly (as shown in FIG. 3) the moulding is cored away under the tongue to increase the flexibility of the latter. The base is also formed with a recess 11 positioned so as to register with the post 2 when the clamping member and base are hinged into overlapping relation.

The clasp is adapted to be non-releasably attached to one end of the band $a$ of plastics or other material and is adapted to clamp the opposite end of the band when the latter is encircled round part of a person, for example, the wrist or ankle.

The non-releasable attachment of one end of the band is effected by impaling the end on the post by a piercing action of the pointed end and thereafter upsetting the post to deform the plastics material to form a flattened head 2a which overlaps and non-releasably clamps the band to the base.

In use, the band encircles the wrist or ankle of a person and the free end is positioned over the end of the band which is secured by the flattened head 2a. The clamping member is then hinged to overlap the base 1 and the transverse free end of the tongue 10 is snapped under the lip 5, the flattened head 2a and the overlying part of the band $a$ being received in the recess 11.

The lip provides a relatively long engagement edge and the tongue also has a relatively long free end so that there will be a large engagement area for these parts. The shape of the tongue and lip will be such as to make positive snapping engagement affording little or no play thereby ensuring that the base and clamping member are non-releasably secured to one another.

When the lip 5 is engaged with the tongue 10, it is located in a recess 10a defined by the cored away portion of the tongue so that accidental disengagement of the lip is impossible.

It will be understood that when the band is positioned round the wrist or ankle, it will be drawn sufficiently tightly to prevent it slipping off.

While the invention is particularly applicable for use in attaching an identification tag to the wrist or ankle of a person, it may be used for attaching an identification tag or other device to any desired article.

Figure 5:
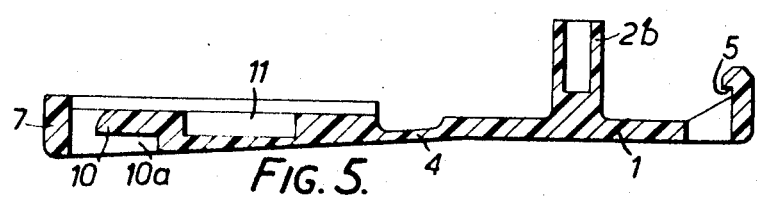
FIG. 5 is a sectional side view of a clasp according to a modification of the invention.

Referring to the modification illustrated in FIG. 5, instead of the post 2b being of solid construction, it is hollow. This has the advantage of making the deformation of the post easier to effect.

When in clamping position the lip and free end of the tongue will be disposed between the side walls 8 and 9. Further, spaced portions of the free end of the band will be offset by the side walls 8 and 9 causing the band to assume a sinuous path which will prevent it being withdrawn by a lateral pull.

I claim:

1. A clasp for securing the ends of a band of synthetic plastics or other material, which is constituted by a one-piece moulding of synthetic plastics material comprising:
   a. a base formed with
      i. an upstanding post adapted to be upset to secure a band impaled thereon against the base, and
      ii. an upstanding wall adjacent one end of said base, said upstanding wall having an inwardly projecting lip adjacent the upper end thereof;

b. a clamping member adapted to co-operate with said base to clamp therebetween the free end of a band secured to said base by said post, said clamping member having
  i. upstanding, lateral band-engaging walls,
  ii. there being a recess formed therein for accommodating the upset portion of said post,
  iii. an upstanding transverse wall at one end thereof, and
  iiii. a tongue formed as a medial portion of said clamping member, said tongue being spaced from said transverse end wall to define a slot for receiving said upstanding wall of said base; and
c. an integral flexible web connecting said base and said clamping member in the manner of a hinge, said web being joined to said clamping member and said base at their ends opposite said transverse end wall and said upstanding wall, respectively, whereby said lip and said tongue are adapted to co-operatively lockingly engage to clamp the free end of a band between said base and said clamping member when said elements of the clasp are pivoted about said hinging web into juxta-position and pressed together.

2. A clasp according to claim 1 wherein said tongue is recessed below the outer surface of said clamping member a distance greater than the height of the lip on said upstanding wall of said base.

* * * * *